United States Patent [19]

Ragimov et al.

[11]  4,396,757
[45]  Aug. 2, 1983

[54] PROCESS FOR PREPARING POLYPHENOLS

[76] Inventors: Adalat V. O. Ragimov, 9 mikroraion, 9-e, kv. 29; Yavus I. O. Rustamov, ulitsa Lenina, 3, kv. 38; Ibragim I. O. Ragimov, 17 mikroraion, 25, kv. 37; Anush G. K. Mamedova, 5 mikroraion, 10, kv. 21, all of Sumgait; Tadzhaddin S. O. Zakirov, 3 Zavodskaya ulitsa, 2, kv. 9, Baku; Amrulla F. O. Amrullaev, 12 mikroraion, 27, kv. 61, Sumgait, all of U.S.S.R.

[21] Appl. No.: 208,833

[22] Filed: Nov. 17, 1980

[51] Int. Cl.³ .................. C08G 65/38; C08G 65/46
[52] U.S. Cl. ............................ 528/212; 422/135; 422/136; 526/71; 528/214
[58] Field of Search ............... 528/212, 214, 219, 483, 528/490, 502; 526/71

[56] References Cited

U.S. PATENT DOCUMENTS

| | | | |
|---|---|---|---|
| 3,025,264 | 3/1962 | Lind | 528/212 |
| 3,573,257 | 3/1971 | Nakashio et al. | 528/212 |
| 3,804,865 | 4/1974 | Rutledge | 528/212 |
| 4,065,434 | 12/1977 | Rutledge | 528/212 |
| 4,237,265 | 12/1980 | Eliassen et al. | 528/212 |

*Primary Examiner*—Lester L. Lee
*Attorney, Agent, or Firm*—Steinberg & Raskin

[57] ABSTRACT

A process for preparing polyphenols, including oxidative polycondensation of a phenol in an aqueous medium in the presence of an oxidizer as well as a subsequent separation of the end product. The starting phenol is mixed with an aqueous solution of an alkali of 5 to 56% concentration in a molar ratio between 1:2.4 and 1:0.25 and heated to a temperature between 70° and 170° C., while air, which furnishes oxygen as the oxidizer, is passed through the reaction mixture.

An apparatus for carrying out the process of the invention comprises a kettle equipped with a heater, a shaft with blades mounted within said kettle and connected to a drive for revolving the shaft, a perforated pipe assembled at the bottom portion of the kettle and communicating with an air blower. The perforated pipe communicates with the air blower through an air treatment chamber.

14 Claims, 1 Drawing Figure

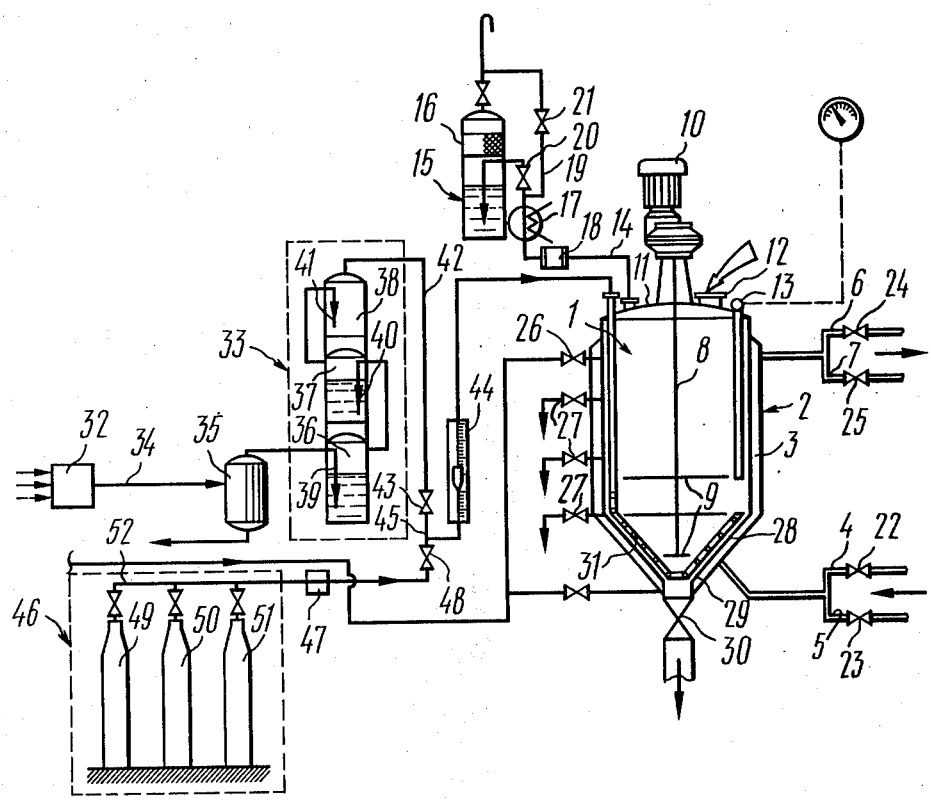

PROCESS FOR PREPARING POLYPHENOLS

BACKGROUND OF THE INVENTION

1. Field of the Invention

The present invention relates to the art of preparing polymers, and more particularly to processes and apparatus for producing polyphenols. The invention is of particular advantage in the case of producing conventional and novel polyphenols featuring characteristics which make them suitable for the manufacture of heat-resistant, chemically resistant, and radiation-resistant materials as well as antistatic materials for coating and other applications. Moreover, polyphenols may be useful as starting materials and curing agents in the synthesis of heat-resistant epoxy resins.

The problem of providing a straightforward and inexpensive process for commercial production of polyphenols is presently needed, even though polymerization of phenols by oxidative polycondensation is well known to those skilled in the pertinent art.

2. Description of the Prior Art

Known in the art is a process for preparing polyphenols by oxidative heteropolycondensation in the presence of a catalyst or catalysts selected from the group consisting of chloride of copper, chloride of iron, chloride of aluminum, and impurities (U.S. Pat. No. 3,678,006 and Soviet Inventor's Certificate No. 448,186).

The polymers obtained in the above process are useful for a wide range of applications but the manufacture thereof is not always profitable. This is due to the fact that the catalysts specified are effective in equimolar ratios or those well in excess of the latter as regards the monomer.

Here account must be taken of a high cost of the catalysts as well as of the fact that they can be used in the polycondensation process but once.

A process for preparing polyhydroquinone is also described in Soviet Inventor's Certificate No. 440,387. This process includes oxidative polycondensation of hydroquinone in an aqueous medium in the presence of oxidizers as well as separation of the end product. Hydrogen peroxide (perhydrol) has been disclosed as an oxidizer in this process.

To effectively oxidize the monomer, an amount of perhydrol in the reaction mixture is to be at least 2.3 mole per one mole of monomer. No doubt the process is advantageous in that the reaction of polycondensation results in the formation of water only, which is easily separated from the end product.

While this process is advantageous as hereinabove described, it still has some significant disadvantages. Thus, an intensive aggressivity of perhydrol requires that there be used a costly corrosion-proof processing equipment. Furthermore, the process described involves special care in view of an explosive nature of perhydrol. Finally, perhydrol, which is used in major amounts, is a relatively high-cost material for an oxidizer.

SUMMARY OF THE INVENTION

It is a principal object of the present invention to provide a relatively low-cost process for preparing polyphenols involving the use of an easily available oxidizer.

Another important object of the present invention is to provide a process for preparing a polyphenol in the presence of an oxidizer which is less aggressive than conventional oxidizers but causes no decrease in the yield of the end product.

It is a further object of the invention to provide a safe process for preparing polyphenols.

Still another object of the invention is to provide a process for preparing heat-resistant polyphenols.

An additional object of the invention is to provide a process which permits the preparation of polyphenols making epoxy-novolac resins highly heat-resistant.

Another object of the present invention is to provide a process for preparing polyphenols, making possible the most complete use of auxiliary material.

Yet another object of the invention is to provide a process which makes it possible to easily separate and reuse unreacted monomers of phenolic series.

It is an additional object of the present invention to provide a process for preparing polyphenols, eliminating pollution of our environment by reaction products.

Another still important object of the present invention is to provide an apparatus for carrying out the process, which enables an effective usage of a low-cost and easily available oxidizer in polycondensation of polyphenols.

A further object of the invention is to provide an apparatus which permits an unreacted monomer of the phenolic series to be separated and reused.

Another additional object of the present invention is to provide a safe and reliable in operation apparatus for preparing polyphenols.

These and other objects of the present invention are attained by providing a process for preparing polyphenols, including oxidative polycondensation of a monomer of phenolic series in an aqueous medium in the presence of an oxidizer as well as a subsequent separation of the end product, wherein, according to the invention, the monomer of phenolic series is mixed with an aqueous solution of alkali of 5 to 56% concentration in a molar ratio between 1:2.4 and 1:0.25 and heated to a temperature between 70° and 170° C., while air, which furnishes oxygen as the oxidizer, is passed through the reaction mixture.

An easily availabe material, such as air, used in this process, makes the same substantially cheaper, yet involves no intensive attack by corrosion upon the processing equipment. Oxygen furnished by air can be effectively used as an oxidizer only under the hereinabove specified conditions. When practiced, such process is relatively safe and enables preparation of sufficiently pure polyphenols at a high yield of the end product. Thus the above polymers are heat resistant and useful both as basic and auxiliary components for the manufacture of heat resistant coatings as well as for preparing various epoxy-novolac compounds.

A monomer of phenolic acid is preferably mixed with an aqueous solution of potassium hydroxide of 11 to 56% concentration. Under such conditions oxidative polycondensation is the most intensive.

A medium for oxidative polycondensation of a monomer of phenolic acid, which can be used, is an aqueous solution of sodium hydroxide of 25 to 56% concentration.

Air used as the oxidizer is to be preferably treated with an alkali. In doing this, carbon dioxide present in the air is taken up by the alkali and subsequently has no adverse effect on the process of oxidative polycondensation. This allows the yield of the monomer of phenolic acid to be increased. The air is preferably to be treated with a concentrated alkaline solution.

To attain the best results, a relative flow rate in passing the air through the reaction mixture should be from 0.007 to 0.016 m$^3$/hr per kilogram of the monomer.

To make the reaction products separated easier, it is worthwhile to cool the mixture of these reaction products to 20° to 80° C. following termination of the step of passing the air through the reaction mixture.

Neutralizing the cooled mixture of the reaction products with a mineral acid and washing the same with water to remove salts that are being formed are the simplest steps in the process. In this case, the most effective is the step of passing carbon dioxide through the mixture of the reaction products after the reaction of oxidative polycondensation of a monomer of phenolic series has terminated.

When phenol ($C_6H_5OH$), alkyl phenol ($C_8H_{17}$), and cresol are used as starting materials for best results the reaction mixture is heated to a temperature of 130° to 155° C. and having been blown with the air it is cooled down to between 50° and 80° C., then mixed with water and blown through with carbon dioxide.

To attain a quality end product, it is appropriate to dry a neutralized and washed mixture of the reaction products at a temperature of 80° to 135° C.

To prevent pollution of the atmosphere, the air that has been passed through the reaction mixture is preferably further passed through an aqueous solution of an alkali. This step permits losses of both basic and auxiliary components (the monomer of the phenolic series and the alkali) to be cut down.

It is advisable to first cool and then pass through an aqueous alkaline solution the air that has been passed through the reaction mixture. This rules out heating of the aqueous alkaline solution and thereby decreases its aggressivity.

These and other objects of the invention are also attained by the provision of an apparatus for carrying out the process, comprising a kettle equipped with a heater, a shaft with blades mounted within said kettle and connected to a drive for revolving the same shaft, a perforated pipe assembled at the bottom portion of the kettle and communicating with an air blower, wherein, according to the invention, the perforated pipe communicates with the air blower by way of a chamber for treating air with an alkali. Feeding the air through the preliminary treatment chamber prevents carbon dioxide from entering the kettle and favors an increase in the yield of polyphenol as well as the production of a pure end product.

The chamber for treating air with an alkali, constructed as a multi-stage adsorber, is the simplest and the most reliable modification of the apparatus of the invention.

The preforated pipe preferably communicates with a source of carbon dioxide. When introduced into the mixture of the reaction products, carbon dioxide bubbles through a suspension and provides for better neutralizing of the alkali.

To maintain optimum operation conditions, it is advisable to provide the perforated pipe at its outlet with a flowmeter.

To utilize the losses of the monomer of phenolic series and the alkali, it is appropriate that the kettle at the upper portion thereof communicates through a pipe with an adsorber filled with an alkali.

To prevent foam and the alkali from being thrown out, it is advisable to provide the adsorber with a packing made of a fibrous material inert to alkalis.

To prevent neutralization of the alkali with carbon dioxide on neutralizing the mixture of the reaction products in the kettle, it is appropriate that there be a bypass pipe connected round said adsorber to provide an excessive carbon dioxide outflow.

It is preferred that the kettle communicate with the adsorber through a back-flow condenser. This will prevent overheating the alkali in the adsorber.

To exercise a timely check of the process and to prevent a troublesome situation, the pipe is preferably provided with a sight glass.

The invention will now be explained in greater detail with reference to the accompanying drawing which illustrates a schematic diagram of the apparatus for carrying out the process.

DETAILED DESCRIPTION OF THE INVENTION

A process for preparing polyphenols of the invention is carried out by means of an apparatus comprising a kettle 1 equipped with a heater 2 constructed in the form of a jacket 3. The jacket 3 communicates with feeding main lines 4 and 5 and with main lines 6 and 7 for removal of vapor and cooling water. A shaft 8 with blades 9 is mounted within said kettle 1 and is connected to a drive 10 for revolving the same shaft. In the upper cover 11 of the kettle 1 there is provided a charge opening 12. A thermocouple 13 is fixed on the upper cover 11. The upper portion of the kettle 1 communicates through the cover 11 with an adsorber 15 by means of a pipe 14. The adsorber 15 is provided with a packing 16 made of a fibrous material inert to alkalis. The kettle 1 communicates with the adsorber 15 through a back-flow condenser 17. The pipe 14 is provided with a sight opening 18 closed with a transparent material. A bypass pipe 19 is connected in parallel with the adsorber 15. The pipe 14 and the bypass pipe 19 are provided with valves 20 and 21. Feeding main lines 4 and 5, and main lines 6 and 7 for removal of vapor and cooling water are provided with valves 22, 23, 24, 25 Pipes 26 and 27 for feeding and removal of washing water are led out at different levels through the side wall of the kettle 1. A bottom 28 of the kettle 1 is constructed conical. A charge pipe 29 closed by means of a valve 30 is led out through the bottom 28. A perforated pipe 31 is mounted in the lower portion of the kettle 1. The perforated pipe 31 communicates with an air blower 32 through a chamber 33 intended for the treatment of air with alkali. A moisture separator 35 is included into the main line 34 between the air blower 32 and the chamber 33. The chamber 33 is constructed as a multi-stage adsorber containing vessels 36, 37, and 38, which vessels communicate in series by means of siphon pipes 39, 40, and 41 and are filled with an aqueous alkaline solution. The chamber 33 communicates with the perforated pipe 31 and a pipe 42 provided with a valve 43. At the inlet of the perforated pipe 31, there is mounted a flow meter 44. The perforated pipe 31 communicates with a carbon dioxide source 46 by means of a pipe 45. Between the source 46 and the perforated pipe 31 within the pipe 45 there are mounted in series a reduction valve 47 and a valve 48. The carbon dioxide source 46 is constructed as a unit of removable vessels 49, 50, 51 which vessels contain carbon dioxide and are interconnected by means of a collector 52.

A process for preparing polyphenols of the invention is carried out as follows. The kettle 1 is charged through the charge opening 12 with a monomer of the phenolic series and an aqueous alkaline solution in a molar ratio between 1:2.4 and 1:0.25. The aqueous alkaline solution is of 5 to 56% concentration. Under the action of the drive 10, the shaft 8 equipped with the blades 9 rotates, thus stirring the monomer of the phenolic series and the aqueous alkaline solution. At the same time, the valves 22 and 24, feeding main lines 4 and main lines 6 for removal of vapor are opened. The vapor circulating over the jacket 3 heats the reaction mixture up to a temperature of 70° to 170° C. Simultaneously, air is fed into the reaction mixture from the air blower 32 through the perforated pipe 31. During the passage of the air through the reaction mixture, for a certain time polyphenol is formed as a result of the oxidative polycondensation of the monomer of the phenolic series.

According to the preferred modification of the process of the invention, the air used as an oxidizer is subjected to preliminary treatment with a concentrated alkaline solution within the vessels 36, 37, 38. The blowing rate is maintained in the range of 0.007 to 0.016 m$^3$/hr per kilogram of the monomer by adjusting efficiency of the air blower 32 or passage section of the valve 43 according to the readings of the flowmeter 44. Thermal conditions within the kettle 1 are maintained by means of the valves 22 and 24 according to the readings of the meter connected to the thermocouple 13. The air which has been passed through the reaction mixture is fed into the adsorber 15 through the pipe 14 and the back-flow condenser 17 while the valve 20 is opened and the valve 21 is closed. Within the adsorber 15, the air is passed through the aqueous alkaline solution, which solution takes up the starting monomer which is unreacted and carried out with the air. The air being preliminarily cooled in the back-flow condenser 17 does not practically heat the alkali in the adsorber 15. Visual control of the production process may be carried out through the sight glass 18, which glass makes it possible to fix the beginning of intensive foam formation in the reaction mixture. The packing 16 prevents the throwing of droplets of the aqueous alkaline solution into the atmosphere.

Potassium or sodium hydroxides are used in the preferred modifications of the production process to form an aqueous alkaline medium. In doing this, an aqueous solution of potassium hydroxide is of 11 to 56% concentration, and that of sodium hydroxide is of 25 to 56% concentration. Following the termination of the reaction of oxidative polycondensation, the valves 22 and 24 are closed, the valves 23 and 25 are opened, and feeding of air is cut off by closing the valve 43. Water is fed into the jacket 3, thus cooling the reaction products down to a temperature of 20° to 80° C. After cooling, the mixture of the reaction products is neutralized with an acid. For this purpose, an aqueous acid solution may be used by means of feeding said solution through the charge opening 12.

According to the preferred modification of the invention, the mixture of the reaction products is neutralized by means of feeding carbon dioxide into the kettle 1. For this purpose, the valve 48 is opened, and carbon dioxide is fed into the kettle 1 from the source 46 through the flowmeter 44 and the perforated pipe 31. In doing this, the valve 20 is closed and the valve 21 is opened. Carbon dioxide which has been passed through the mixture of the reaction products is led out into the atmosphere through the pipe 14 and the bypass pipe 19. Neutralized mixture of the reaction products is settled in the kettle 1 with the drive 10 being switched on. After the gravitational separation of the suspension formed, water is fed through the pipes 26 to remove formed salts and unreacted monomer through the pipes 27. Neutralized and washed mixture of the reaction products is dried at a temperature of 80° to 135° C. For this purpose, the valves 22 and 24 are closed, thus feeding heated vapor into the jacket 3.

When using phenol ($C_6H_5OH$), alkyl phenol ($C_8H_{17}$) and cresol as starting materials, the reaction mixture is heated to a temperature of 130° to 155° C. and after blowing with air said mixture is cooled to a temperature of 50° to 80° C., mixed with water and blown through with carbon dioxide.

The dried polyphenol is discharged through the pipe 29 by means of opening the valve 30.

Now the invention will be illustrated by the specific examples thereof which follow.

EXAMPLE 1

Polyphenol was prepared according to the present invention as follows. To the kettle was added 18.8 kg of phenol and 20 kg of an aqueous solution of potassium hydroxide. The aqueous solution of potassium hydroxide was of 56% concentration. Thus, molar ratio of the components was 1:1. Phenol and the aqueous solution of potassium hydroxide were mixed and heated to a temperature of 155° C. Air was passed through the reaction mixture at the same temperature for 8 hours. A relative flow rate of the air was 0.016 m$^3$/hr per kilogram of phenol. Following the termination of the polycondensation reaction of phenol, the mixture of the reaction products was cooled to a temperature of 70° C. After the mixture had been cooled, 30 kg of water and 22 kg of a 35% muriatic acid was added to the mixture to neutralize the alkali. The suspension of polyphenol in the aqueous medium, containing potassium chloride and unreacted phenol, was held in the kettle to settle. After settling of the polymer suspension, potassium chloride and unreacted phenol were washed out with warm water. The washed powder of the polymer was dried at 80° C. until all the moisture was removed, and then discharged from the kettle.

The yield of the end product, i.e. polyphenol, was 48% by weight. Polyphenol was in the form of powder consisting of particles having an amorphous structure. The polyphenol was of the following characteristics:

| softening point, °C. | 125 |
|---|---|
| decomposition temperature, °C. | 500 |

The polyphenol showed good solubility in polar solvents such as acetone, dimethylformamide, sulphuric acid, aqueous alkaline solutions.

Such characteristics make the polyphenol obtained useful for manufacturing heat resistant coatings, for application as curing agent to cold-setting adhesives, as a binder and hardener to epoxy resins. Yet the polymer obtained shows a good processibility due to a relatively low softening point and good solubility.

EXAMPLE 2

Polyphenol was prepared according to the present invention basically as disclosed in Example 1, following the same conditions. However, the reaction mixture was heated to a temperature of 130° C., and the air applied for passing through the reaction mixture was not subjected to preliminary treatment with alkali.

The yield of the end product, i.e. polyphenol, was 30% by weight. Polyphenol was in the form of amorphous powder and was of the following characteristics:

| softening point, °C. | 105 |
| decomposition temperature, °C. | 450 |

The polyphenol showed good solubility in polar solvents such as acetone, dimethylformamide, sulphuric acid, aqueous alkaline solutions.

Application of the polyphenol thus obtained is similar to that described in Example 1.

EXAMPLE 3

Polyphenol was prepared according to the present invention basically as disclosed in Example 1, following the same conditions. However, the reaction mixture was heated to a temperature of 170° C. and the air applied for passing through the reaction mixture was not subjected to preliminary treatment with alkali.

The yield of end product, i.e. polyphenol, was 55% by weight. Polyphenol was in the form of an amorphous powder and was of the following characteristics:

| softening point, °C. | 180 |
| decomposition temperature, °C. | 500 |

The polyphenol showed good solubility in polar solvents such as aqueous alkaline solutions, sulphuric acid, acetone, dimethylformamide etc.

The polyphenol obtained may be the most useful for the same purpose as the polyphenol obtained according to Example 1.

EXAMPLE 4 (NEGATIVE)

Polyphenol was prepared basically as disclosed in Example 1, following the same conditions. However, the reaction mixture was heated to a temperature of 180° C., which temperature was above the limits specified in the claims.

The results appeared to be as follows:

| yield of polyphenol, % by weight | 27 |
| softening point, °C. | 210 |
| decomposition temperature, °C. | 500 |

The polyphenol obtained under such conditions is of a high molar weight which weight has an adverse effect on solubility of said polyphenol and results in a comparatively high melting point. It makes difficult further processing of the obtained polymer.

EXAMPLE 5

Poly-α-naphthol was prepared according to the invention as follows. To the kettle was added 14.4 kg of α-naphthol and 25 kg of an aqueous solution of potassium hydroxide. Said solution of potassium hydroxide was of 11% concentration, the molar ratio between said components being 1:0.5. The mixture obtained was heated to 98° C. at continuous mixing. Air was passed through the reaction mixture at the same temperature for 8 hours. A relative flow rate was 0.009 m³/hr per kilogram of α-naphthol.

The air being fed into the reaction mixture was cooled and passed through an aqueous solution of concentrated alkali in which solution the admixtures of α-naphthol brought out with the air were taken up. Thus cleaned air was led out into atmosphere. Following the termination of the polycondensation reaction of α-naphthol the mixture of the reaction products was cooled to a temperature of 45° C. and then neutralized by passing carbon dioxide therethrough.

The suspension of poly-α-naphthol in an aqueous medium being formed in the neutralization reaction and containing potassium carbonate and unreacted α-naphthol, was separated as follows. The suspension was settled for some time in the kettle and then washed with water having a temperature of 20° to 30° C. to separate potassium carbonate. Unreacted α-naphthol was separated by washing the suspension with water heated to a temperature of 70° to 80° C. The flushed powder of the polymer was dried at 135° C. until all the moisture was removed and then was discharged from the kettle.

The yield of the end product, i.e. poly-α-naphthol, was 93% by weight. Poly-α-naphthol obtained in the form of amorphous powder was of the following characteristics:

| softening point, °C. | 200 |
| decomposition temperature, °C. | 550 |
| solubility | soluble in polar solvents specified in Example 1. |

Apart from the fields of application specified in Example 1, poly-α-naphthol obtained according to this example may be used as a binder for carbon compositions and organic plastics, e.g. graphite-containing grease.

EXAMPLE 6

Poly-α-naphthol was prepared according to the invention basically as disclosed in Example 5. However, an aqueous solution of sodium hydroxide in an amount of 25 kg was used, which solution was mixed with 14.4 kg of α-naphthol in a molar ratio of 0.5:1.

The mixture obtained was heated to a temperature of 95° C. At this temperature air was continuously passed through the reaction mixture for 8 hours. A specific flow rate was 0.009 m³/hr per kilogram of α-naphthol. The air being fed into the reaction mixture was preliminarily passed through an aqueous solution of sodium hydroxide to separate carbon dioxide. The air which had been passed through the reaction mixture was then cooled and was passed through the aqueous sodium hydroxide solution to take up the admixture of α-naphthol contained therein. Following the termination of air feeding, the reaction mixture was cooled to a temperature of 20° C.

The obtained aqueous alkaline solution of α-naphthol was used as a phenolic component in manufacturing heat-resistant and heat stable epoxy resins, and as a catalyst for hardening epoxy-phenolic compounds.

EXAMPLE 7

Poly-α-naphthol was prepared according to the invention basically as disclosed in Example 6. However, the following conditions were maintained: α-naphthol in an amount of 14.4 kg was mixed with 40 kg of an aqueous solution of sodium hydroxide in a molar ratio of 1:0.5. The aqueous solution of sodium hydroxide was of 5% concentration. The mixture obtained was heated to a temperature of 95° C. At this temperature, air was continuously passed through the reaction mixture for 8 hours. A relative flow rate was 0.009 m³/hr per kilogram of α-naphthol. The air being fed into the reaction mixture was preliminarily passed through an aqueous solution of sodium hydroxide to separate carbon dioxide. The air which had been passed through the reaction mixture was then cooled and was passed through the aqueous solution of sodium hydroxide to take up the admixture of α-naphthol contained therein. Following the termination of air feeding, the reaction mixture was cooled to a temperature of 20° C. Carbon dioxide was passed through the mixture of the reaction products to neutralize sodium hydroxide. The mixture of the reaction products thus processed was then held in the kettle to settle and was washed with water having a temperature of 20° to 30° C. to remove sodium carbonate therefrom. Then the reaction products were washed with distilled water having a temperature of 70° to 80° C., and unreacted α-naphthol was removed.

The flushed powder of the polymer was dried at 80° C. until all the moisture was removed and then was discharged from the kettle.

The yield of an end product, i.e. poly-α-naphthol, was 85% by weight.

Poly-α-naphthol obtained in the form of an amorphous powder was of the following characteristics:

| softening point, °C. | 170 |
| decomposition temperature, °C. | 500 |

The poly-α-naphthol showed good solubility in polar solvents specified in Example 1.

Such characteristics make it possible to apply poly-α-naphthol for the same purposes as those specified in Example 1.

EXAMPLE 8

Poly-α-naphthol was prepared according to the invention basically as disclosed in Example 5. However, the following conditions were maintained: α-naphthol in an amount of 14.4 kg was mixed with 25 kg of an aqueous solution of potassium hydroxide in a molar ratio of 1:0.5. The mixture obtained was heated to a temperature of 70° C. At this temperature, air was continuously passed through the reaction mixture for 8 hours. A relative flow rate was 0.009 m³/hr per kilogram of α-naphthol.

The air being fed into the reaction mixture was preliminarily passed through an aqueous solution of potassium hydroxide to separate carbon dioxide therefrom.

The air which had been passed through the reaction mixture was then cooled to a temperature of 45° C. and was neutralized by passing carbon dioxide therethrough. The suspension of poly-α-naphthol in an aqueous medium being formed in the neutralization reaction and containing potassium carbonate and unreacted α-naphthol was separated by the gravitational method. The precipitate of a polymer obtained in said separation was washed out with water having a temperature of 20° to 30° C. to remove potassium carbonate therefrom, and then was washed with distilled water having a temperature of 70° to 80° C. to separate unreacted α-naphthol. The flushed powder of the polymer was dried at a temperature of 135° C. until all the moisture was removed and then was discharged from the kettle.

The yield of end product, i.e. poly-α-naphthol, was 70% by weight. Poly-α-naphthol obtained in the form of an amorphous powder was of the following characteristics:

| softening point, °C. | 100 |
| decomposition temperature, °C. | 450 |

The poly-α-naphthol showed good solubility in polar solvents specified in Example 1.

Such characteristics make it possible to use poly-α-naphthol as a plasma-resistant film forming component applied in manufacturing photoresistors.

EXAMPLE 9

Poly-α-naphthol was prepared basically as disclosed in Example 8 while maintaining the same conditions. However, the reaction mixture was heated to a temperature of 60° C. which temperature was beyond the limits specified in the claims.

The results appeared to be as follows:

| yield of poly-α-naphthol, % by weight | 50 |
| softening point, °C. | 60 |
| decomposition temperature, °C. | 400 |

Low values of heat resistance and softening point prevent the use of poly-α-naphthol thus obtained as a binder and in manufacturing coatings.

EXAMPLE 10

Poly-β-naphthol was prepared according to the invention as follows: β-naphthol in an amount of 14.4 kg was mixed with 61 kg of an aqueous solution of potassium hydroxide of 22% concentration and having the molar ratio of 1:2.4. The mixture obtained was heated to a temperature of 80° C. At this temperature, air was continuously passed through the reaction mixture for 6 hours. A specific flow rate was 0.007 m³/hr per kilogram of β-naphthol. The air being fed into the reaction mixture was preliminarily passed through an aqueous solution of potassium hydroxide to remove carbon dioxide. The air which had been passed through the reaction mixture was then cooled and was passed through the aqueous solution of potassium hydroxide to take up the admixture of α-naphthol contained therein. Following the termination of air feeding the reaction mixture was cooled to a temperature of 45° C. and was then neutralized by passing carbon dioxide therethrough. The suspension of polymer in the aqueous medium being formed in the reaction of neutralization and containing carbon dioxide and unreacted monomer, was separated by the gravitational method. The precipitate of poly-β-naphthol obtained during said separation was separated as disclosed in Example 8.

The yield of an end product, i.e. poly-β-naphthol, was 78% by weight. Poly-β-naphthol obtained in the form of an amorphous powder was of the following characteristics:

| softening point, °C. | 110 |
| decomposition temperature, °C. | 450 |

The poly-β-naphthol showed good solubility in polar solvents specified in Example 1.

Such characteristics make it possible to apply poly-β-naphthol for the same purposes as those specified in Example 1.

EXAMPLE 11

Poly-β-naphthol was prepared according to the invention as follows: β-naphthol in an amount of 14.4 kg was mixed with 14 kg of an aqueous solution of potassium hydroxide of 11% concentration and having the molar ratio of 1:0.25. The mixture obtained was heated to a temperature of 80° C. At this temperature, air was continuously passed through the reaction mixture for 8 hours. A relative flow rate was 0.007 m$^3$/hr per kilogram of β-naphthol. The air being fed into the reaction mixture was preliminarily passed through an aqueous solution of patassium hydroxide to remove carbon dioxide therefrom. The air which had been passed through the reaction mixture was then cooled and was passed through the aqueous solution of potassium hydroxide to take up the admixture of β-naphthol contained therein. Following the termination of air feeding, the reaction mixture was cooled to a temperature of 45° C. Neutralization of said mixture and separation of the end product, i.e. poly-β-naphthol, were carried out as disclosed in Example 5 but the polymer obtained was dried at a temperature of 80° C.

The yield of the end product, i.e. poly-β-naphthol was 20% by weight. Poly-β-naphthol obtained in the form of amorphous powder was of the following characteristics:

| | |
|---|---|
| softening point, °C. | 200 |
| decomposition temperature, °C. | >500 |

The poly-β-naphthol showed good solubility in polar solvents specified in Example 1.

EXAMPLE 12 (NEGATIVE)

Poly-β naphthol was prepared basically as disclosed in Example 9 while maintaining the same conditions. However, naphthol was mixed with potassium hydroxide in the molar ratio of 1:3.

Thus, the molar ratio was beyond the range specified in the claims.

The results appeared to be as follows:

| | |
|---|---|
| yield of poly-β-naphthol, % by weight | 40 |
| softening point, °C. | 50 |
| decomposition temperature, °C. | 300 |

As can be seen from the above data, poly-β-naphthol thus obtained is of a low heat resistance. Furthermore, the ductility of the reaction mixture is so high that it results in significant decrease in contact between the mixture and air and considerably affects specific power consumption required for stirring.

EXAMPLE 13 (NEGATIVE)

Poly-β-naphthol was prepared basically as disclosed in Example 11 while maintaining the same conditions. However, β-naphthol was mixed with potassium hydroxide in the molar ratio of 1:0.2. Such a ratio was beyond the range specified in the claims.

The results appeared to be as follows:

| | |
|---|---|
| yield of poly-β-naphthol, % by weight | 15 |
| softening point, °C. | 50 |
| decomposition temperature, °C. | 300 |

The commercial realization of such a modification of the production process is inexpedient because of an extremely low yield of the end product, i.e. poly-β-naphthol.

EXAMPLE 14

Polyalkyl phenol (C$_8$H$_{17}$) was prepared according to the invention basically as disclosed in Example 1. However, the following conditions were maintained: alkyl phenol (C$_8$H$_{17}$) in an amount of 41 kg was mixed with 20 kg of an aqueous solution of potassium hydroxide of 56% concentration and having the molar ratio of 1:1. The mixture obtained was heated to a temperature of 155° C. At this temperature, air was continuously passed through the reaction mixture for 8 hours. A relative flow rate was 0.009 m$^3$/hr per kilogram of alkyl phenol (C$_8$H$_{17}$). The air being fed into the reaction mixture was preliminarily passed through the aqueous solution of potassium hydroxide to remove carbon dioxide therefrom. The air which had been passed through the reaction mixture was then cooled and was passed through the aqueous solution of potassium hydroxide to take up the admixture contained therein. Following the termination of air feeding, the reaction mixture was cooled to a temperature of 20° C. Neutralization and separation of the end product, i.e. polyalkyl phenol, was carried out as disclosed in Example 1.

The yield of the end product, i.e. polyalkyl phenol, was 70% by weight. Polyalkyl phenol obtained in the form of a ductile liquid was of the following characteristics:

decomposition temperature, °C. >300

The polyalkyl phenol (C$_8$H$_{17}$) showed good solubility in the oil hydrocarbons. This allows said polymer to be employed in preparing cheap and nontoxic varnishes.

EXAMPLE 15 (negative)

Polyalkyl phenol (C$_8$H$_{17}$) was prepared basically as disclosed in Example 14 while maintaining the same conditions. However, temperature conditions of heating the reaction mixture were beyond the limits of the range specified in claim 10 of the claims. In particular, the reaction mixture was heated to a temperature of 110° C.

The results appeared to be as follows:

| | |
|---|---|
| yield of polyalkyl phenol, % by weight | 10 |
| decomposition temperature, °C. | 300 |

It will be understood that the commercial realization of such a modification of the production process is inexpedient because of an extremely low yield of the end product.

EXAMPLE 16

Polycresol was prepared according to the invention basically as disclosed in Example 1. However, the following conditions were maintained. Polycresol in an amount of 22 kg was mixed with 29 kg of an aqueous solution of potassium hydroxide in the molar ratio of 1:1.

The aqueous solution of potassium hydroxide was of 39% concentration. The mixture obtained was heated to a temperature of 155° C. At this temperature, air was continuously passed through the reaction mixture for 8 hours. A relative flow rate was 0.016 m³/hr per kilogram of cresol. The air being fed into the reaction mixture was preliminarily passed through an aqueous solution of potassium hydroxide to remove carbon dioxide therefrom. The air which had been passed through the reaction mixture was then cooled and was passed through the aqueous solution of potassium hydroxide to take up the admixtures of paracresol contained therein. Following the termination of air feeding, the reaction mixture was cooled to a temperature of 80° C., mixed with water and neutralized with sulphuric acid. After settling and gravitational separation, the suspension of the reaction products was washed with water having a temperature of 20° to 30° C. to remove potassium chloride. Then the reaction products were washed with distilled water having a temperature of 70° to 80° C., and unreacted para-cresol was removed. Flushed powder of the polymer was dried at 80° C. until all the moisture was removed and was discharged from the kettle.

The yield of the end product, i.e. polycresol, was 40% by weight. The polycresol obtained in the form of amorphous power was of the following characteristics:

| softening point, °C. | 65 |
|---|---|
| decomposition temperature, °C. | 500 |

The polycresol showed good solubility in polar solvents specified in Example 1.

Such characteristics make it possible to employ the polycresol for the same purpose as the polyphenol obtained according to Example 1.

EXAMPLE 17

Polyhydroquinone was prepared according to the invention basically as disclosed in Example 7. However, the following conditions were maintained: hydroquinone in an amount of 25 kg was mixed with 27 kg of an aqueous solution of sodium hydroxide in the molar ratio of 1:0.5. The aqueous solution of sodium hydroxide was of 15% concentration. The mixture obtained was heated to a temperature of 98° C. At this temperature, air was continuously passed through the reaction mixture for 5 hours. A specific flow rate was 0.016 m³/hr per kilogram of hydroquinone. The air being fed into the reaction mixture was preliminarily passed through an aqueous solution of sodium hydroxide to remove carbon dioxide. The air which had been passed through the reaction mixture was then cooled and was passed through the aqueous solution of sodium hydroxide to take up the admixture of hydroquinone. Following the termination of air feeding, the reaction mixture was cooled to a temperature of 45° C.

Neutralization of the mixture and separation of the end product were carried out as disclosed in Example 5, but the polymer obtained was dried at a temperature of 130° C.

The yield of the end product, i.e. polyhydroquinone, was 80% by weight. The polyhydroquinone obtained in the form of amorphous powder was of the following characteristics:

| softening point, °C. | 295 |
|---|---|
| decomposition temperature, °C. | >500 |

The polyhydroquinone showed good solubility in polar solvents such as specified in Example 1.

Such characteristics make it possible to employ the polyhydroquinone for the same purposes as those given in Example 5.

EXAMPLE 18 (negative)

Polyhydroquinone was prepared basically as disclosed in Example 17 while maintaining the same conditions. However, an aqueous solution of sodium hydroxide was of 4% concentration, which concentration being beyond the limits of the range specified in the claims.

The results appeared to be as follows:

| yield of polyhydroquinone, % by weight | 20 |
|---|---|
| softening point, °C. | 295 |
| decomposition temperature, °C. | 500 |

Because of the low yield of the end product, i.e. polyhydroquinone, it is not advisable to realize this modification of the production process from the economic point of view.

EXAMPLE 19 (negative)

Polyhydroquinone was prepared basically as disclosed in Example 17 while maintaining the same conditions. However, the concentration of the aqueous solution of sodium hydroxide was 60%, i.e. said concentration was beyond the limits of the range specified in the claims.

The results appeared to be as follows:

| yield of polyhydroquinone, % by weight | 20 |
|---|---|

Commercial realization of such a modification of the production process is inexpedient because of an extremely low yield of the end product. Furthermore, in the process of preparing the polymer, the ductility of the reaction mixture is so high that it results in significant decrease in contact between the mixture and air and considerably affects specific power consumption required for stirring.

EXAMPLE 20 (negative)

Polyhydroquinone was prepared basically as diclosed in Example 17 while maintaining the same conditions. However, the rate of air blown through the mixture was 0.017 m³/hr per kilogram of the monomer, i.e. said blowing rate of air was beyond the limits of the range specified in the claims.

The results appeared to be as follows:

| yield of polyhydroquinone, % by weight | 30 |
|---|---|
| softening point, °C. | 295 |
| decomposition temperature, °C. | 500 |

In the process of oxidative polycondensation, an intensive foaming of the reaction mixture was observed. By-products were formed in large quantity.

EXAMPLE 21 (negative)

Polyhydroquinone was prepared basically as disclosed in Example 17 while maintaining the same conditions.

However, the blowing rate of air through the reaction mixture was 0.006 m$^3$/hr per kilogram of hydroquinone.

The yield of the end product, i.e. hydroquinone, was 35% by weight. Polyhydroquinone obtained in the form of amorphous powder was of the following characteristics:

| | |
|---|---|
| softening point, °C. | 295 |
| decomposition temperature, °C. | 500 |

However, a great number of admixtures which were difficult to separate in this modification of the production process did not allow the polymer obtained to be employed for epoxyphenolic compounds.

While the invention has been described herein in terms of specific Examples, numerous variations may be made in the invention without departing from the spirit and scope thereof as set forth in the appended claims.

What is claimed is:

1. Method for the polycondensation of phenolic monomers, which comprises heating a mixture of a polymerizable phenolic monomer in an aqueous solution of an alkali of a concentration of 5–56% and having a molar ratio of phenolic monomer to alkali of 1:2.4–1:0.25 to a temperature of 70°–170° C., said phenolic monomer being phenol, alkyl (C$_8$H$_{17}$) phenol, cresol, alpha-naphthol, beta-naphthol or hydroquinone, and passing air through the thus heated mixture to effect polycondensation of phenolic monomer to form the corresponding polymer of said phenolic monomer.

2. Method according to claim 1 wherein said alkali is potassium hydroxide in a concentration of 11–56%.

3. Method according to claim 1 wherein said alkali is sodium hydroxide in a concentration of 25–56%.

4. Method according to claim 1 wherein the air prior to being passed through said heated mixture is treated to remove carbon dioxide therefrom.

5. Method according to claim 4 wherein said treatment is effected by treating the air with a concentrated alkali solution.

6. Method according to claim 1 wherein said air is passed through the heated mixture at a flow rate of from 0.007 to 0.016 m$^3$/hr per kilogram of said monomer.

7. Method according to claim 1 wherein after completion of the reaction effected by passing air through said heated mixture, the resulting reaction mixture is cooled to temperature of 20°–80° C.

8. Method according to claim 7 wherein the cooled reaction mixture is neutralized with a mineral acid and washed with water.

9. Method according to claim 1 wherein after completion of the polycondensation reaction, carbon dioxide is passed through the resulting reaction mixture.

10. Method according to claim 8 wherein the neutralized, washed reaction mixture is dried at a temperature of 80°–135° C.

11. Method according to claim 1 wherein the air after being passed through the reaction mixture is passed through an aqueous alkaline solution.

12. Method according to claim 10 wherein the air is cooled and then passed through an aqueous solution.

13. Method according to claim 1 wherein the phenolic monomer is phenol, alkyl (C$_8$H$_{17}$) phenol or cresol and the reaction is effected at a temperature of 130°–155° C.

14. Method according to claim 1 wherein upon completion of the polycondensation reaction, the reaction mixture is cooled to a temperature of 50°–80° C., mixed with water and carbon dioxide is blown therethrough.

* * * * *